(12) United States Patent
Tanaka (10) Patent No.: US 7,705,928 B2
(45) Date of Patent: Apr. 27, 2010

(54) LIQUID CRYSTAL DISPLAY DEVICE (75) Inventor: Shigekuni Tanaka, Chiba (JP)

(73) Assignee: Hitachi Displays, Ltd., Mobara-shi (JP)

( * ) Notice: Subject to any disclaimer, the term of this patent is extended or adjusted under 35 U.S.C. 154(b) by 272 days.

(21) Appl. No.: 11/755,026

(22) Filed: May 30, 2007

(65) Prior Publication Data
US 2007/0279547 A1 Dec. 6, 2007

(30) Foreign Application Priority Data
Jun. 5, 2006 (JP) ............................. 2006-156344

(51) Int. Cl.
G02F 1/1333 (2006.01)
(52) U.S. Cl. ....................................................... 349/58
(58) Field of Classification Search ............... 349/58–60
See application file for complete search history.

(56) References Cited
U.S. PATENT DOCUMENTS

| | | | |
|---|---|---|---|
| 6,919,937 B2 | 7/2005 | Kim et al. | |
| 7,369,189 B2 * | 5/2008 | Chieh | 349/58 |
| 7,528,898 B2 * | 5/2009 | Hashimoto | 349/58 |
| 2003/0058380 A1 | 3/2003 | Kim et al. | |
| 2005/0259191 A1 * | 11/2005 | Park et al. | 349/58 |
| 2005/0280750 A1 * | 12/2005 | Cho et al. | 349/58 |
| 2006/0290836 A1 * | 12/2006 | Chang | 349/58 |

FOREIGN PATENT DOCUMENTS

| | | |
|---|---|---|
| CN | 1553255 A | 8/2004 |
| JP | 2001-133756 | 5/2001 |
| JP | 2004-029651 | 1/2004 |
| JP | 2004-062048 | 2/2004 |
| JP | 2005-166336 | 6/2005 |
| JP | 2005-338497 | 12/2005 |
| KR | 2003-0028152 | 4/2003 |

* cited by examiner

*Primary Examiner*—Michelle R Connelly Cushwa
(74) *Attorney, Agent, or Firm*—Antonelli, Terry, Stout & Kraus, LLP.

(57) ABSTRACT

A small-sized display device having a holder for holding a liquid crystal display panel and a frame for accommodating the holder is disclosed. Projecting portions 41 are formed in part of the holder 4 and are used as horizontal stoppers against the liquid crystal panel. Cutout portions 71 are formed in the frame 7 at positions corresponding to the projecting portions 41 of the holder 4. The outer surfaces of the projecting portions 41 of the holder are made almost flush with the outline of the frame 7 or are made somewhat inside the frame outline. With this configuration, the frame thickness is reduced, and tolerance dimensions in assembling the frame and the holder need not be taken into account, thus making it possible to reduce the outline size of the display device.

18 Claims, 9 Drawing Sheets

LIQUID CRYSTAL DISPLAY DEVICE

CLAIM OF PRIORITY

The present application claims priority from Japanese Application JP 2006-156344 filed on Jun. 5, 2006, the content of which is hereby incorporated by reference into this application.

BACKGROUND OF THE INVENTION

1. Field of the Invention

The present invention relates to a technique capable of reducing an outline size of a set in a small-sized liquid crystal display device used in a portable telephone or the like.

2. Description of the Related Art

In connection with a liquid crystal display device there is a strong demand for reducing an outline size of a set while keeping a certain screen size. To meet this demand various efforts have been made for narrowing the frame of a liquid crystal panel, improving the accuracy of parts of a liquid crystal panel holder, reducing the holder thickness, improving the accuracy of parts of a metallic frame serving as an outer frame, reducing the thickness of the metallic frame, and reducing the size of a back light structure.

Figure 12:
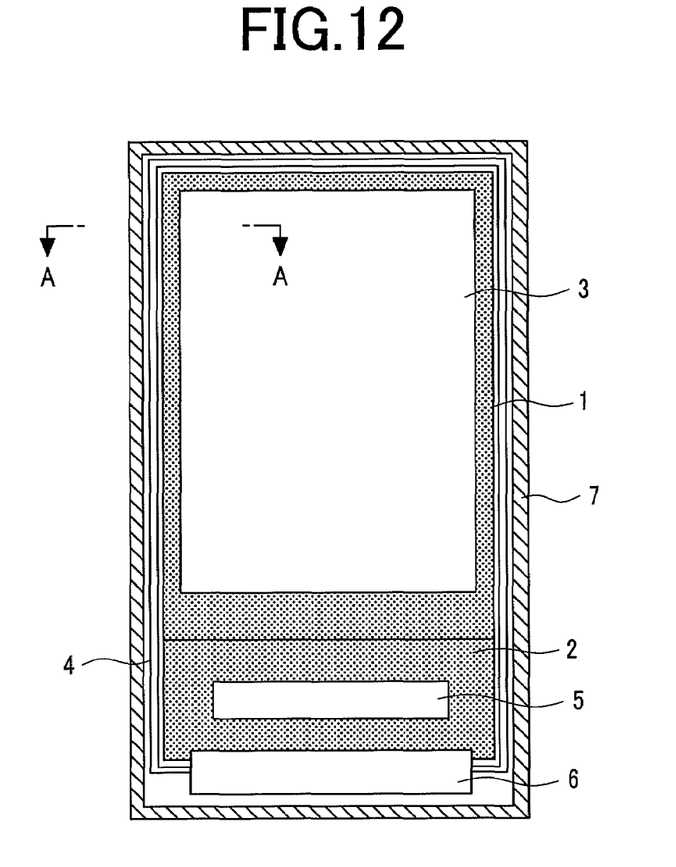
FIG. 12 is a plan view showing a conventional example.

FIG. 12 is a plan view of a portable telephone using a conventional liquid display device. A liquid crystal display panel forms an image by applying a signal voltage for each pixel to liquid crystal held grippingly between an upper glass substrate 1 and a lower glass substrate 2. An upper polarizing plate 3 is affixed to the upper glass substrate. Numeral 4 denotes a holder for accommodating a liquid crystal panel. The holder 4 is usually formed of resin. An IC chip 5 for driving the liquid crystal is mounted on the lower glass substrate 2 of the liquid crystal panel. Numeral 6 denotes a flexible wiring substrate, which supplies for example an electric current to the liquid crystal driving IC chip 5. The flexible wiring substrate 6 is turned back and is integral with a back light provided on the back side of the liquid crystal panel. A combination of the liquid crystal panel, the drive circuit and the back light is called a liquid crystal module, which is accommodated inside a metallic frame 7.

There has been a demand for maintaining an effective screen size and reducing an outline size of a set while maintaining the basic configuration of the liquid crystal display device.

Such a conventional technique is described in the following Patent Literatures: JP-A-2001-133756; JP-A-2004-29651; JP-A-2004-62048; and JP-A-2005-338497.

Figure 13:
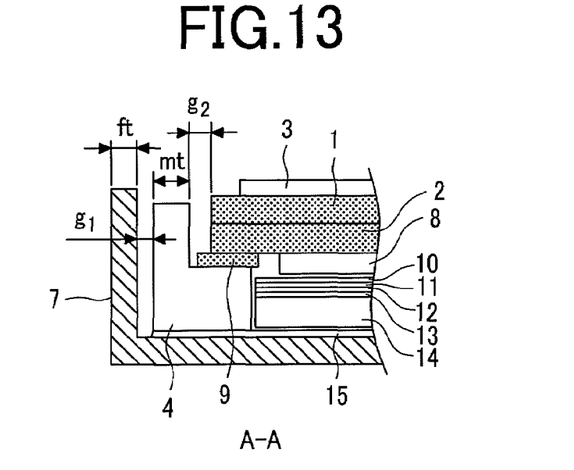
FIG. 13 is a sectional view of a principal portion of the conventional example.

To reduce the size of a set such as a portable telephone, the following have been adopted: reduction in the size of a liquid crystal module; reduction in the thickness of a metallic frame; and improvement in the assembling accuracy of both liquid crystal module and metallic frame. FIG. 13 is a sectional view taken along line A-A of FIG. 12 showing a conventional example.

In FIG. 13, the same parts as in FIG. 12 are identified by the same reference numerals as in FIG. 12. A lower polarizing plate 8 is affixed to the lower glass substrate 2. The holder 4 is stepped in two stages, with the liquid crystal panel being mounted on the stepped portion. The lower substrate of the liquid crystal panel is bonded to the holder through a double coated light shielding adhesive tape 9. The double coated light shielding adhesive tape not only fixes the liquid crystal panel to the holder but also prevents the entry of light from the back light to the peripheral portion of the liquid crystal screen with a consequent lowering in contact of the screen peripheral portion. Numeral 10 denotes an upper diffusing sheet, numeral 11 denotes an upper prism sheet, numeral 12 denotes a lower prism sheet, numeral 13 denotes a lower diffusing sheet, and numeral 14 denotes a light guide plate. Further, numeral 15 denotes a reflecting plate, which reflects light traveling downward from the light guide plate and causes it to travel toward the liquid crystal panel.

In order to reduce the outline size of the set, assuming that the outline size of the liquid crystal panel is constant, the following can be adopted: for example, reduction in the wall thickness mt of an upper portion of the holder 4 shown in FIG. 13; reduction in the wall thickness ft of the frame 7; narrowing of a gap g1 between the frame 7 and the holder 4; or narrowing of a gap g2 between the liquid crystal panel 1 and the upper portion of the holder 4.

However, a limit is encountered in the abovementioned means. Reducing the wall thickness ft of the frame 7 and reducing the wall thickness mt of the holder upper portion to below respective certain values encounter problems in machining. Moreover, the gap g1 between the frame 7 and the holder 4, as well as the gap g2 between the liquid crystal panel 1 and the holder 4, are required from the standpoint of part tolerance and assembling process. To reduce those sizes, it is necessary to make small the tolerances of the outline sizes of the parts. However, making small the tolerances of the parts concerned leads to a rise of the cost for the parts due to, for example, a lowering of the yield of the parts.

SUMMARY OF THE INVENTION

The present invention overcomes the above-mentioned problems and reduces the outline size of a display device without causing an increase of the manufacturing cost. A liquid crystal display device according to the present invention mainly adopts the following configurations and thereby overcomes the above-mentioned problems.

(1) A liquid crystal display device comprising a liquid crystal panel, a holder for holding the liquid crystal panel thereon, and a frame for accommodating the holder, the frame having a bottom and a flange portion partially formed with a cutout portion, the holder having an outward projecting portion corresponding to the cutout portion of the flange portion of the frame.

(2) A liquid crystal display device according to (1), wherein the inner surface of the projecting portion of the holder corresponds to an outline of the liquid crystal display panel.

(3) A liquid crystal display device according to (3), wherein in the cutout portion of the frame there is present a flange portion shorter than the other portion of the frame.

(4) A liquid crystal display according to (1), wherein a flange portion is not present in the cutout portion of the frame.

(5) A liquid crystal display according to (1), wherein the holder has an outline of a generally rectangular shape and a plurality of the projecting portions are formed on three sides of the holder.

(6) A liquid crystal display device according to (1), wherein the projecting portion of the holder has a planar shape such that an outside width thereof is smaller than a base width thereof.

(7) A liquid crystal display device according to (1), wherein the projecting portion of the holder has a generally trapezoidal plane shape such that an upper bottom is an outer side and a lower bottom is a base side.

(8) A liquid crystal display device according to (1), wherein the projecting portion of the holder has a generally trapezoidal plane shape such that the angle of each of side portions relative to a lower bottom is in the range of 10° to 45°.

(9) A liquid crystal display device comprising a liquid crystal panel, the liquid crystal panel comprising an upper glass substrate and a lower glass substrate of a larger area than the upper glass substrate, the liquid crystal panel having a first end portion at which the upper glass substrate and the lower glass substrate overlap each other and a second end portion of only the lower glass substrate, the liquid crystal panel being placed on a holder, the holder being accommodated inside a frame, wherein the holder has an outward projecting portion, the frame has a bottom and a flange portion partially formed with a cutout portion, the outward projecting portion of the holder corresponding to the cutout portion of the flange portion of the frame, the inner surface of the projecting portion of the frame corresponding to the first end portion of the liquid crystal panel.

(10) A liquid crystal display device according to (9), wherein the inner surface of the projecting portion of the holder serves as a stopper in the horizontal direction against the liquid crystal panel.

(11) A liquid crystal display panel according to (9), wherein the projecting portion of the holder is not formed at the second end portion of the liquid crystal panel.

According to the present invention, the outline size of the liquid crystal display device can be reduced while maintaining the image display area constant. That is, as described in the above means, by projecting a part of the holder outward and forming a cutout portion in the flange portion of the frame corresponding to the projecting portion of the holder, the liquid crystal substrate can be made larger by an amount corresponding to the plate thickness of the frame. Conversely, if the size of the liquid crystal glass substrate is made constant, the outline of the display device can be made smaller by an amount corresponding to the plate thickness of the frame.

By adopting the present invention, the outline of the display device can be reduced without deteriorating the strength of the frame, etc. Besides, since it is not necessary to perform any forcible machining for the holder and the frame in an effort to reduce the outline size, it is possible to prevent an increase of the cost for the parts. Moreover, since an allowable error in assembling the set can be made equal to that in the conventional art, it is also possible to prevent an increase of the manufacturing cost.

Further, according to the present invention, since the glass substrate of liquid crystal and the metallic frame do not contact each other directly, it is possible to prevent damage of the glass substrate.

DESCRIPTION OF REFERENCE NUMERALS

1 . . . Upper glass substrate
2 . . . Lower glass substrate
3 . . . Upper polarizing plate
4 . . . Holder
5 . . . IC chip
6 . . . Flexible wiring substrate
7 . . . Frame
8 . . . Lower polarizing plate
9 . . . Double coated light shielding adhesive tape
14 . . . Light guide plate
41 . . . Projecting portion of holder
71 . . . Cutout portion of frame

DETAILED DESCRIPTION OF PREFERRED EMBODIMENTS

Detailed contents of the present invention will be descried below by way of embodiments thereof. Although in the following embodiments reference will be made to a liquid crystal display as an example, it goes without saying that the present invention is also applicable to display devices of a configuration having a display panel holder and a frame for accommodating the holder, e.g., OLED.

First Embodiment

Figure 1:
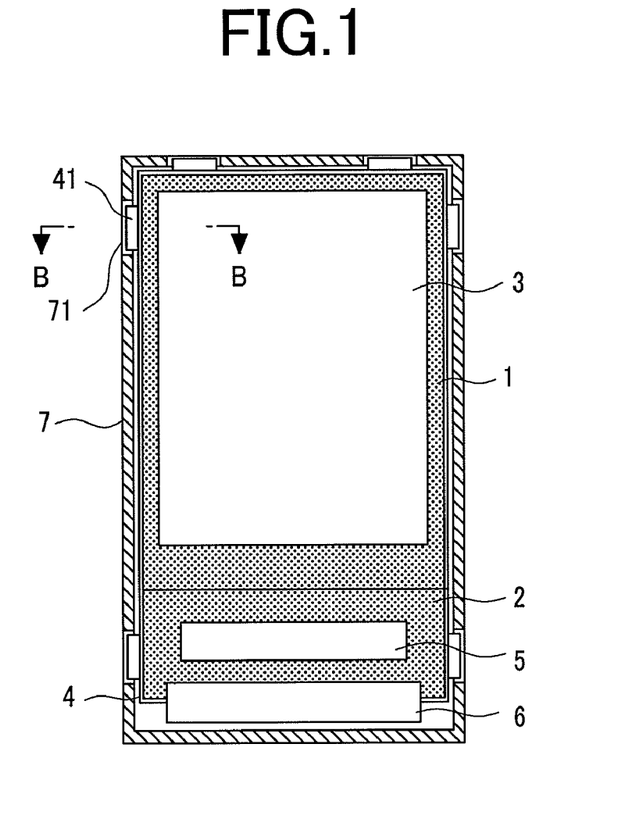
FIG. 1 is a plan view of a first embodiment of the present invention.

FIG. 1 is a plan view of a display device according to a first embodiment of the present invention. The same parts as in the conventional example are identified by the same reference numerals as in the conventional example. A wall which horizontally accommodates a glass substrate of a holder 4 shown in FIG. 1 is not formed throughout the whole circumference of the glass substrate, but projecting portions 41 are formed in plural positions to accommodate a liquid crystal panel in the horizontal direction. That is, the projecting portions 41 serve as horizontal stoppers against liquid crystal. Since the projecting portions 41 thus serving as stoppers in the holder project outwardly, cutout portions 71 are formed in corresponding portions of a metallic frame 7.

Figure 2:
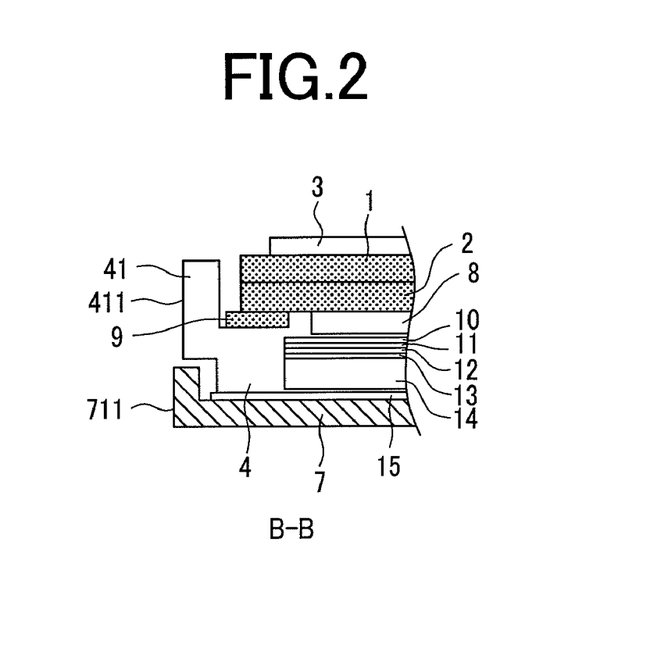
FIG. 2 is a sectional view of a principal portion in the first embodiment.

FIG. 2 is a sectional view taken on line B-B in FIG. 1. The cutout portions 71 are formed in the metallic frame 7 in outside portions corresponding to the projecting portions 41 of the holder 4. Short flanges 711 of the frame 7 are formed in the cutout portions 71 respectively A wall portion for fixing the liquid crystal panel in the horizontal direction is not formed in any other portion than the portions where the projecting portions 41 of the holder 4 are formed. Also in this case, the liquid crystal panel is not disengaged because a double coated light shielding adhesive tape is present.

Thus, the liquid crystal panel can be enlarged by an amount corresponding to the outward projections of the projecting portions 41 of the holder. Conversely, if the outline of the liquid crystal panel is constant, the outline of the frame 7 can be made smaller by an amount corresponding to the outward projections of the holder projecting portions 41. Since the liquid crystal panel is inhibited from its horizontal motion by the holder projecting portions which are formed of resin, the glass substrate which constitutes the liquid crystal panel does not come into direct contact with the frame as a metallic frame.

In the case where the outline is to be made smaller in the conventional structure, it is necessary to decrease the wall thickness mt of the upper portion of the holder shown in FIG. 13. But making it very thin is difficult in machining and is also difficult in maintaining the strength of parts. A limit is encountered in the wall thickness mt of the holder upper portion shown in FIG. 13, which limit is about 0.35 mm for example. Making the frame thickness ft shown in FIG. 13 extremely small is also difficult in machining and this is true from the standpoint of ensuring the product strength. The frame is usually fabricated using a stainless steel sheet. In a special case, a stainless steel sheet which is as thin as about 0.1 mm is used. However, usually, a stainless steel sheet of 0.3 mm is used taking for example the easiness of material fabrication into account. Further, when the assembling of the holder 4 and the frame 7 is taken into account, it is necessary that the inside diameter of the frame be larger than the holder outline by at least 0.1 mm. These conditions exert a great influence on the reduction in size of the outline.

On the other hand, according to the present invention, since the flange portions of the frame 7 are not present in the portions where the projecting portions 41 of the holder 4 are present, the outline size has a margin by an amount corresponding to the wall thickness of each flange portion of the frame and also to the frame-holder assembling tolerance. Consequently, any forcible machining is not required for the holder and the frame.

Thus, according to the present invention, in addition to the effect that the product outline can be reduced in size, there accrues an advantage that an increase of the parts cost can be prevented because it is not necessary to perform any forcible machining for the frame. Also, since the holder and the frame need not be thinned to an extreme degree, it is possible to ensure the product strength and improve the product reliability.

In this first embodiment, outer surfaces 411 of the projecting portions of the holder are formed inside the outer surfaces 711 of the frame. This is because the outer surfaces of the projecting portions are to be prevented from projecting beyond the frame in consideration of the parts tolerance. If a slight projection of the holder is allowed, the outer surfaces 411 of the projecting portions of the holder and the outer surfaces 711 may be flush with each other.

Figure 3A:
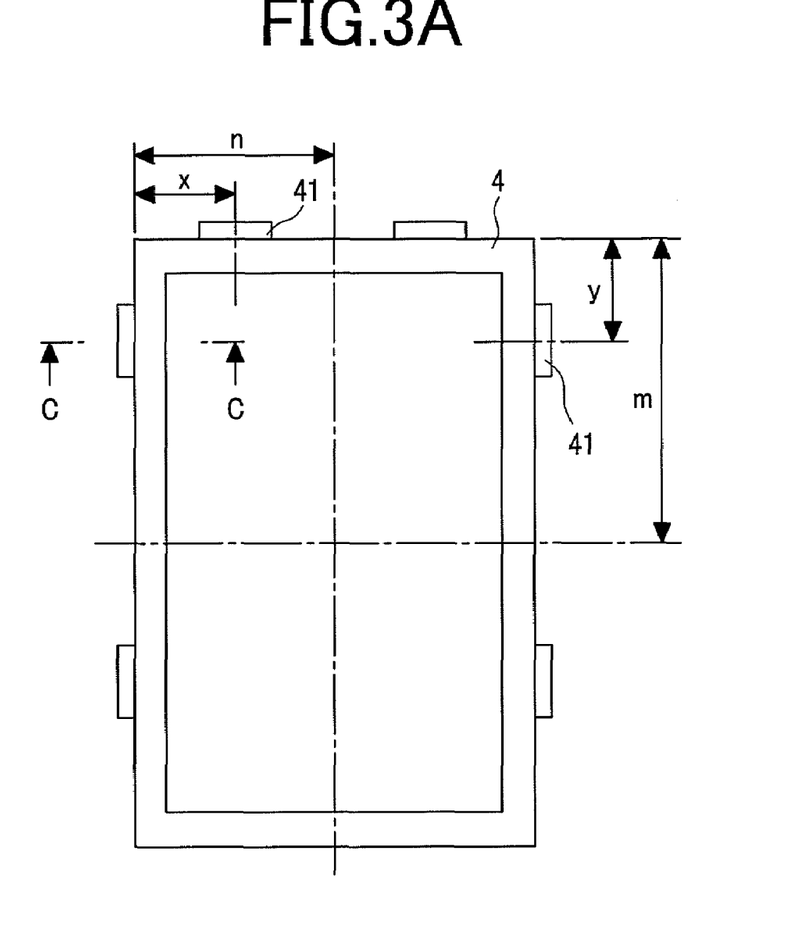
FIG. 3A illustrates a holder used according to the first embodiment.
Figure 3B:
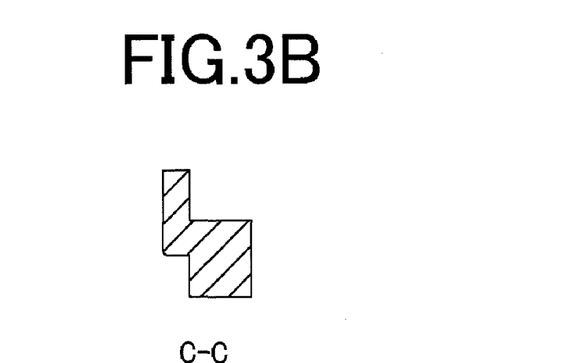
FIG. 3B is a sectional view of the holder.
Figure 4A:
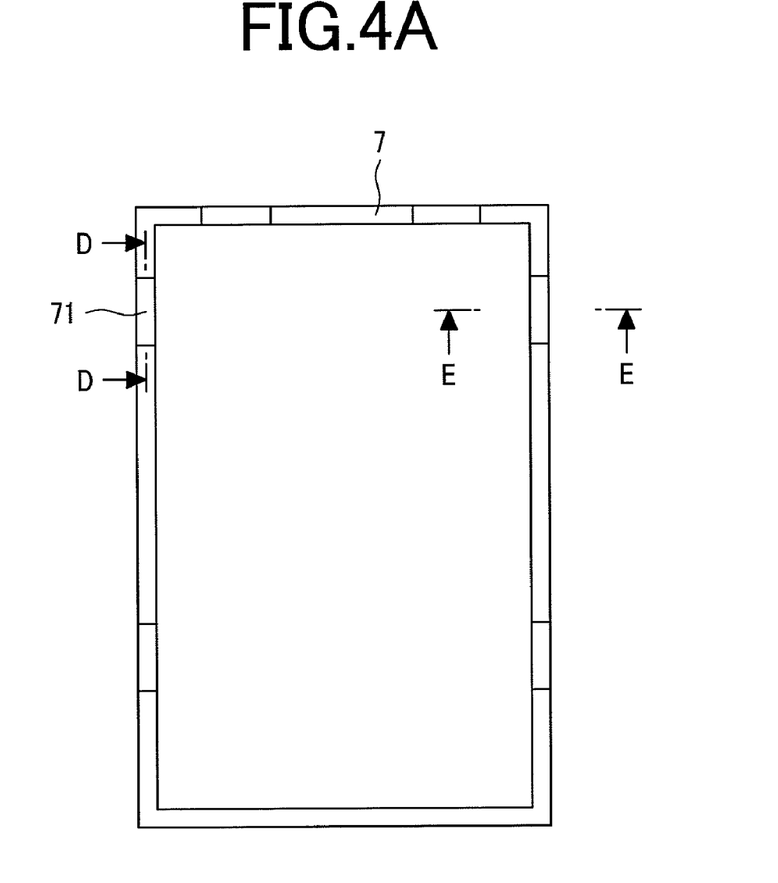
FIG. 4A is a plan view showing a frame used in the first embodiment.
Figure 4B:
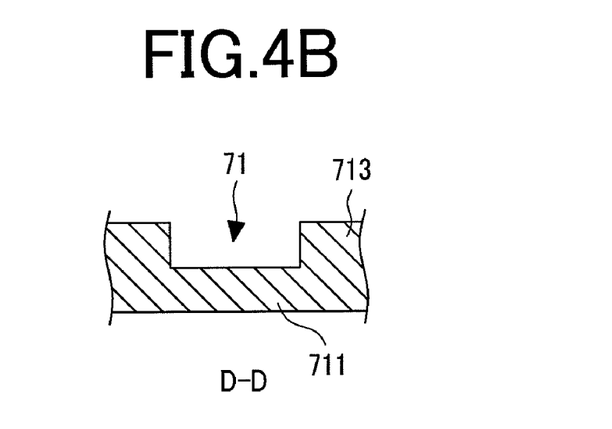
FIG. 4B is a sectional view in a side direction of a flange portion of the frame.
Figure 4C:
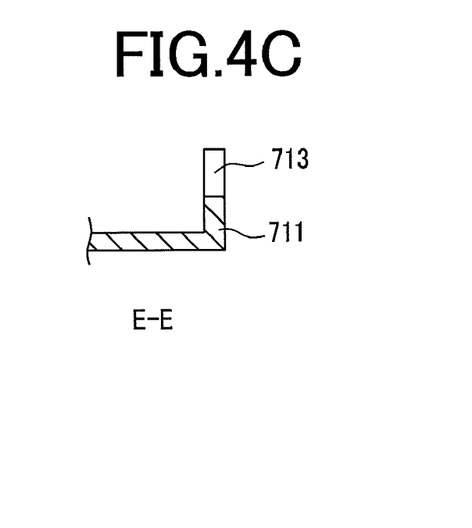
FIG. 4C is a sectional view in a direction orthogonal to the side of the flange portion of the frame.

FIG. 3A is a plan view of only the holder 4 used in this embodiment and FIG. 3B is a sectional view taken on line C-C in FIG. 3A. FIG. 4A is a plan view of only the frame 7, FIG. 4B shows a D-D section of a cutout portion 71, and FIG. 4C shows an E-E section of the cutout portion 71. In FIGS. 4B and 4C there are shown a short flange 711 and a long flange 713 which constitutes the greater part of the frame 7. The shape of the holder 4 looks complicated, but does not cause an increase of cost because the holder 4 is formed by injection molding. Besides, since the frame 7 is formed of metal, e.g., stainless steel, it can be subjected to a pressing or drawing work, not causing an increase of cost.

In this first embodiment, the projecting portions of the holder 4 are formed in three sides as shown in FIG. 3A. On the side where the projecting portions 41 are not formed, a flexible wiring substrate 6 is formed at the portion opposed to the frame 7, as shown in FIG. 1. Where required, the side free of the projecting portions 41 may be formed in the same shape as the other sides. The reason why two projecting portions 41 are thus formed on each side of the holder 4 is that it is intended to prevent rotation of the holder 4. Although in this embodiment two projecting portions of the holder 4 are formed on each of the three sides, the number of such projecting portions to be formed on each side need not always be two. It may be determined taking for example the strength of the frame and the liquid crystal glass substrate holding stability into account.

In this embodiment, the two projecting portions 41 on each side are formed near end portions of each side. On a short side, the position of each projecting portion 41 is preferably determined in such a manner that when a half length of the short side is assumed to be n, the distance, x, from an end portion of the short side to the center of the projecting portion 41 is n/2 or less. On each long side, when a half length of the long side is assumed to be m, the position of each projecting portion 41 on the long side is preferably determined so that the distance, y, from an end portion of the long side to the center of the projecting portion 41 is m/2 or less.

Figure 5:
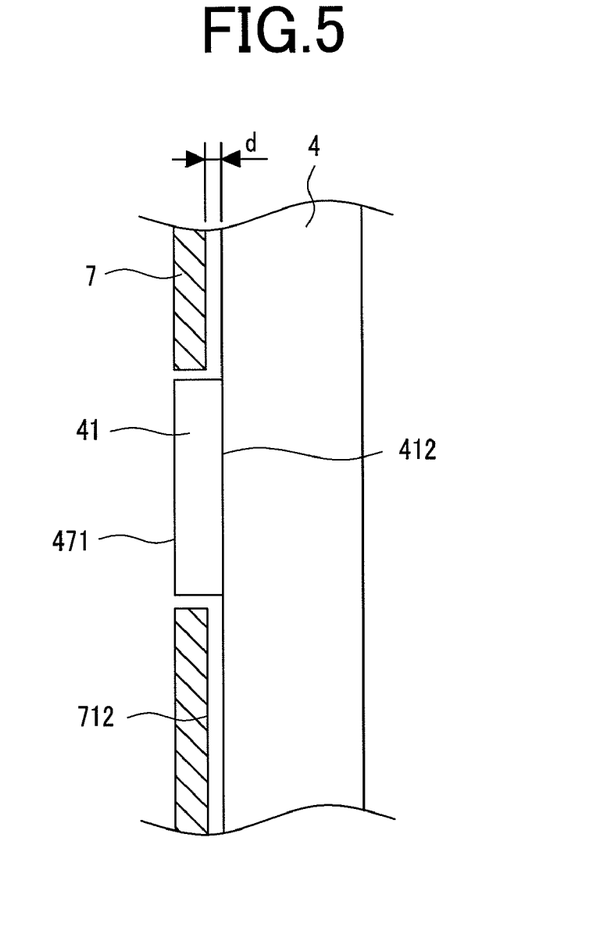
FIG. 5 is a plan view of a holder projecting portion and a frame cutout portion according to the first embodiment.

FIG. 5 is a plan view showing a combined state of both projecting portion 41 of the holder 4 and the frame 7. In this embodiment, the inner surface, indicated at 412, of each projecting portion serves as a stopper against the liquid crystal glass, but the 412 plane lies inside an inner surface 712 of the frame. According to this configuration, by setting the value of d shown in FIG. 5 to a finite value, it is possible to prevent direct contact of glass with the frame 7 as a metallic frame.

Figure 6:
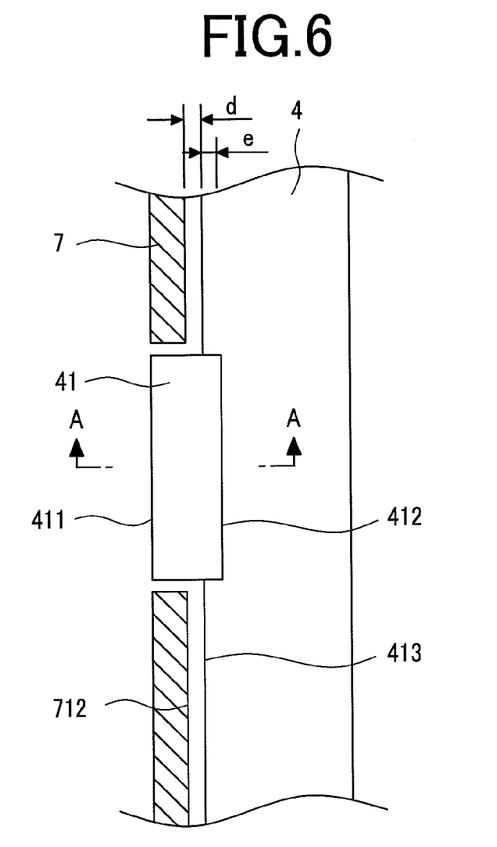
FIG. 6 is a plan view showing another example of a holder projecting portion and a frame cutout portion according to the first embodiment.
Figure 7:
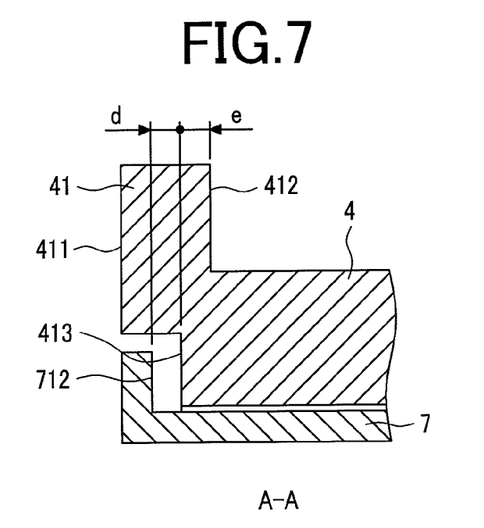
FIG. 7 is a partial sectional view of FIG. 6.

FIG. 6 shows an example in which a further tolerance is given to the contact between the glass substrate and the frame. FIG. 7 is a sectional view taken on line A-A in FIG. 6. In both FIGS. 6 and 7, the inner surface 412 of each projecting portion 412 of the holder serving as a stopper against the glass substrate lies inside an outer edge 413 of the projection-free portion of the holder. The value of e is preferably 0.1 mm or larger. By so doing, in the example shown in FIGS. 6 and 7, the tolerance for the contact between the glass substrate and the metallic frame 7 can be set at d+e. Therefore, the tolerance against chipping of the glass substrate caused by contact of the glass substrate with the metallic frame 7 can be taken larger than in the example shown in FIG. 5.

Second Embodiment

Figure 8:
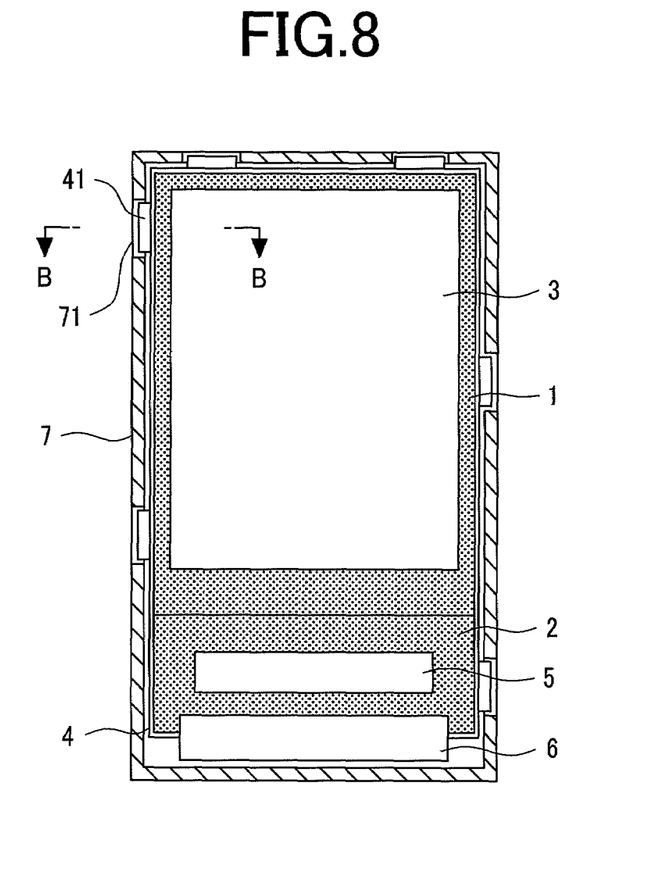
FIG. 8 is a plan view of a second embodiment of the present invention.
Figure 9:
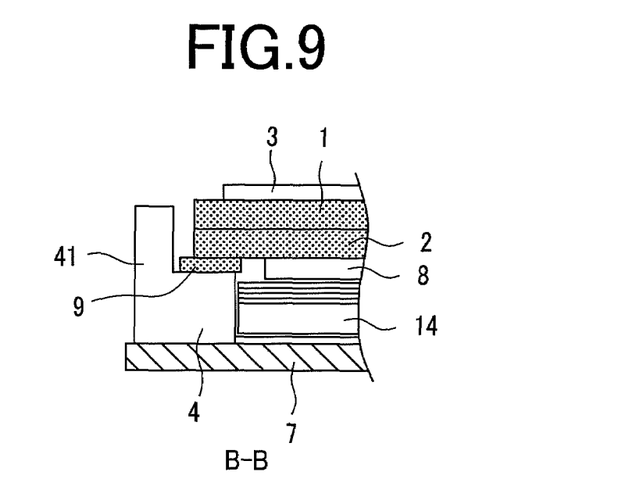
FIG. 9 is a sectional view of a principal portion of the second embodiment.

FIG. 8 is a plan view showing a second embodiment of the present invention and FIG. 9 is a partial sectional view thereof. The same parts as in FIGS. 1 and 2 are identified by the same reference numerals as in FIGS. 1 and 2. This second embodiment is different from the first embodiment in that the cutout portions 71 of the frame 7 are not formed with a flange. According to this configuration, the corresponding holder 4 need not be complicated in shape and it is possible to improve the strength and easiness of fabrication of the holder 4. What the holder strength can be improved means that the holder can be made much thinner. This takes effect also in point of reducing the product outline size.

Although there is a possibility that the mechanical strength of the frame 7 may be deteriorated due to the absence of flange in the cutout portions 71 of the frame 7, this problem can be solved by shifting the positions of the cutout portions 71 relative to each other on two opposed sides as shown in FIG. 8. Also in this case it is preferable that plural cutout portions be present on each side of the frame and plural projecting portions be present on each side of the holder.

According to this embodiment, it is possible to cut down the parts cost and fabricate a highly reliable display device.

Third Embodiment

Figure 10:
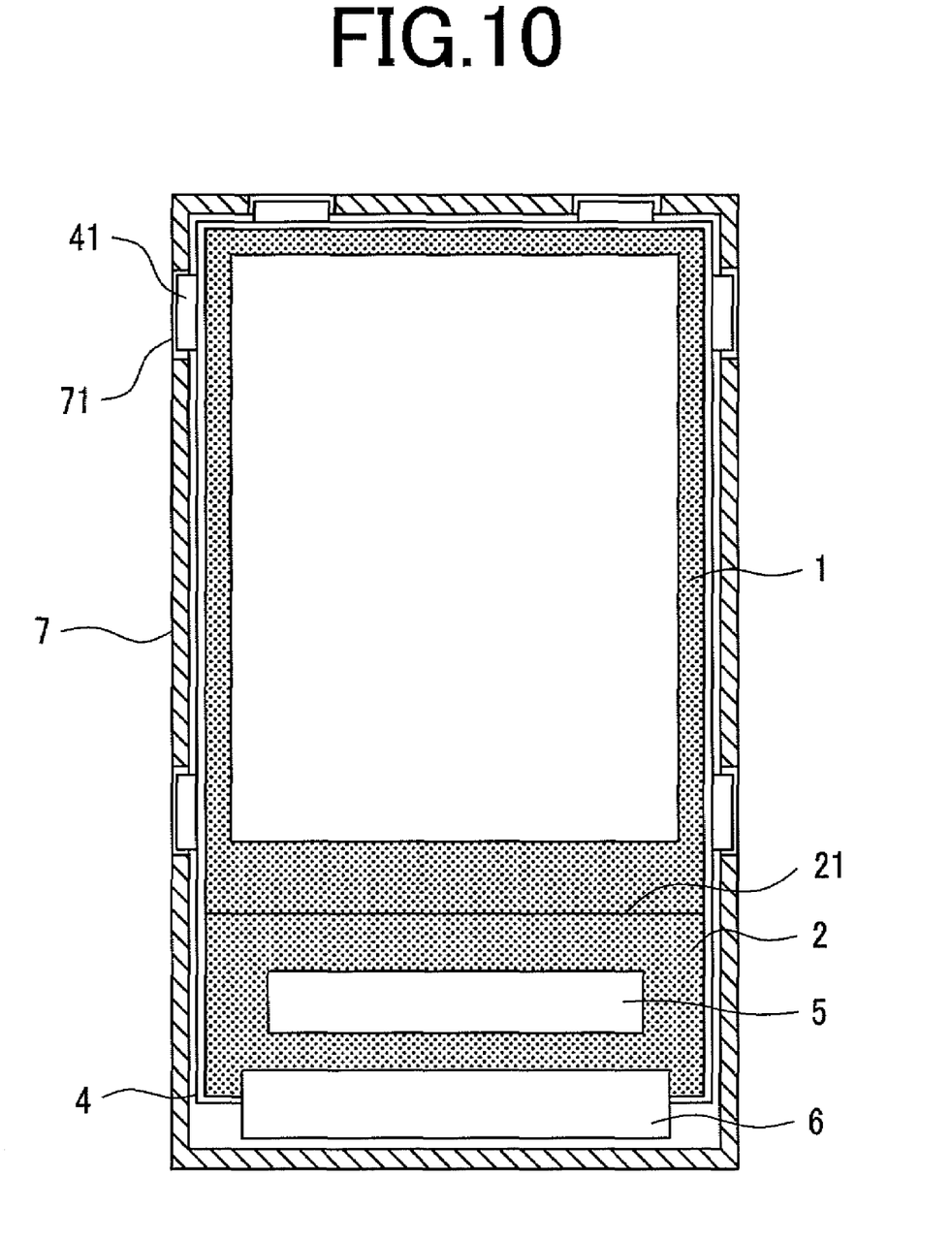
FIG. 10 is a plan view of a third embodiment of the present invention.

A third embodiment of the present invention is shown in FIG. 10. In the same figure, a lower glass substrate 2 of a liquid crystal panel is longer on a long side than an upper glass substrate 1 of the panel. On the side lower than a boundary line 21 there is present only the lower glass substrate 2. In the area where only the lower glass substrate 2 is present there are installed parts, e.g., a drive circuit.

In this embodiment, projecting portions 41 of a holder are provided in only the area where both upper and lower glass substrates of the liquid crystal panel are present. Consequently, only the double glass substrate portion of the liquid crystal panel, which portion is high in strength, comes into contact with the inner surfaces of the projecting portions 41 of the holder 41, so that the danger such as breakage of the glass substrates decreases.

Thus, according to this third embodiment it is possible to fabricate a display device of a small outline size and high reliability.

Fourth Embodiment

One object of the present invention is to reduce the outline size of the frame while keeping the liquid crystal glass substrate and the metallic frame 7 out of contact with each other. For the purpose, in the first embodiment, the inner surfaces 412 of the projecting portions of the holder are used as stoppers to prevent contact between the glass substrate and the metallic frame 7, as shown in FIG. 5. In the structure of FIG. 5, however, when an end portion of the metallic frame 7 bends inwards, there is a possibility that the frame end portion comes into contact with the glass substrate.

Figure 11:
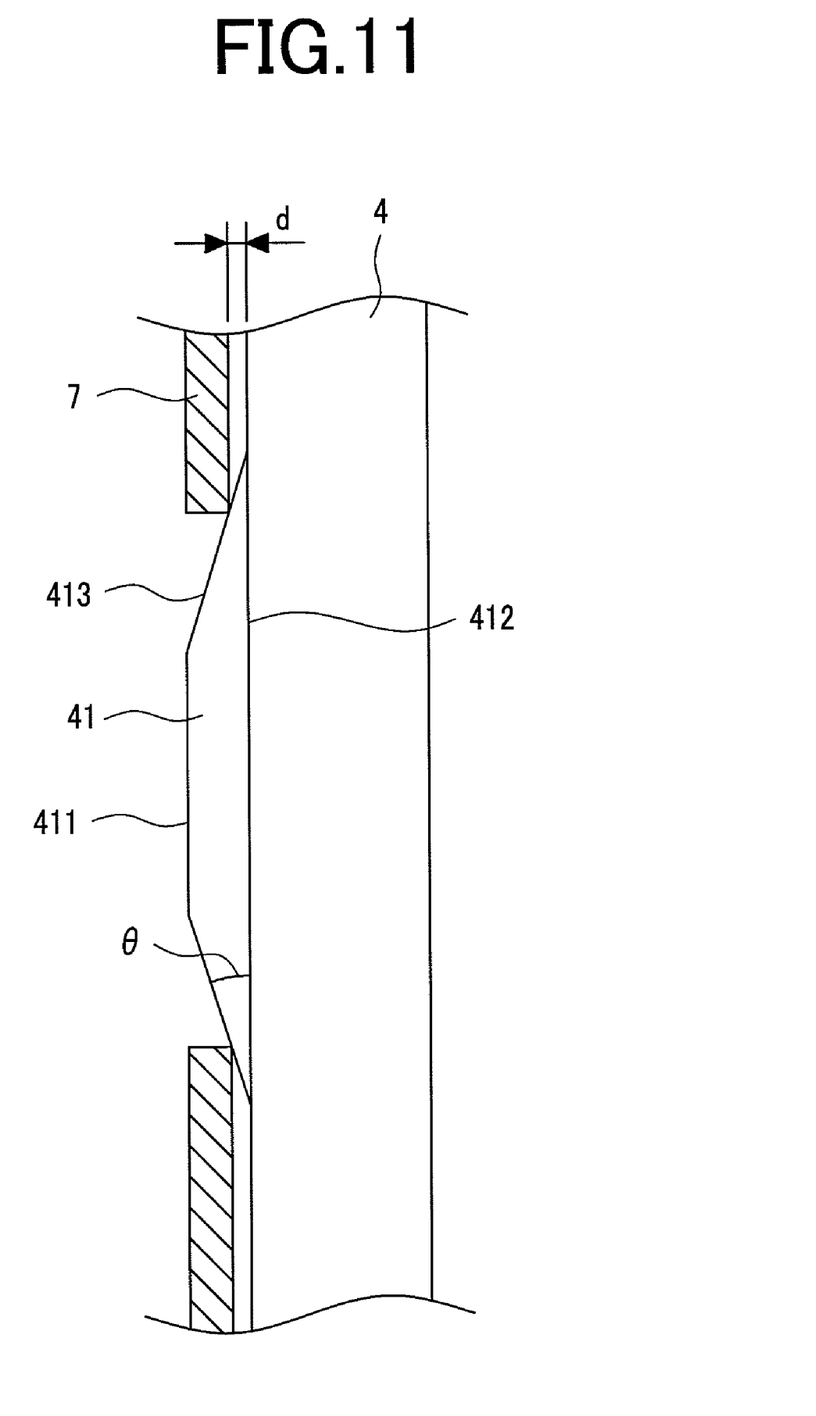
FIG. 11 illustrates a principal portion of the third embodiment.

In this fourth embodiment, to avoid such a possibility, a planar shape of each projecting portion 41 of a holder 4 is made a tapered trapezoidal shape as shown in FIG. 11, whereby it is intended to surely prevent contact between the metallic frame 7 and the glass substrate. More specifically, in this fourth embodiment, a side portion of a trapezoidal projecting portion 42 of the holder 4 is present under an end portion of the metallic frame 7 to prevent contact between the metallic frame 7 and the glass substrate. It follows that at the end portion of the metallic frame 7, there is no tolerance between the holder and the projecting portion. However, since each side of the trapezoidal projecting portion 42 has an angle θ, it is possible to assemble the metallic frame 7 and the holder 4 without forcibleness. The angle θ is preferably in the range of 10° to 45°.

According to this fourth embodiment, it is possible to fabricate a display device of a small outline size and high reliability.

What is claimed is:

1. A liquid crystal display device comprising:
a liquid crystal panel;
a holder for holding the liquid crystal panel thereon; and
a frame for accommodating the holder, wherein
the frame has a bottom and a flange portion partially formed with a-cutout portions; and
the holder has outward projecting portions corresponding to the cutout portions of the flange portion of the frame,
wherein the holder does not have a wall that horizontally accommodates the liquid crystal panel throughout the whole circumference of the liquid crystal panel, and
wherein the outward projecting portions serve as horizontal stoppers against the liquid crystal panel.

2. The liquid crystal display device according to claim 1, wherein the inner surfaces of the projecting portions of the holder correspond to an outline of the liquid crystal panel.

3. The liquid crystal display device according to claim 1, wherein in the cutout portions of the frame, the flange portion is shorter than the other portions of the frame.

4. The liquid crystal display device according to claim 1, wherein a flange portion is not present in the cutout portions of the frame.

5. The liquid crystal display device according to claim 1, wherein the holder has an outline of a generally rectangular shape, and the projecting portions are formed on three sides of the holder.

6. The liquid crystal display device according to claim 1, wherein each of the projecting portions formed on the holder has a planar shape such that an outside width thereof is smaller than a base width thereof.

7. The liquid crystal display device according to claim 1, wherein each of the projecting portions of the holder has a generally trapezoidal plane shape such that an upper bottom of the projecting portion is an outer side and a lower bottom of the projecting portion is a base side.

8. The liquid crystal display device according to claim 1, wherein each of the projecting portions of the holder has a generally trapezoidal plane shape such that the angle of each of side portions of each of the projecting portions relative to a lower bottom of the projecting portion is in the range of 10° to 45°.

9. The liquid crystal display device according to claim 1, wherein the inner surfaces of the projecting portions of the holder lie inside an outer edge of the portion of the holder where the projecting portions are not formed.

10. A liquid crystal display device comprising:
a liquid crystal panel that includes an upper glass substrate and a lower glass substrate of a larger area than the upper glass substrate, and that has a first end portion at which the upper glass substrate and the lower glass substrate overlap each other and a second end portion of only the lower glass substrate, and that is placed on a holder, the holder being accommodated inside a frame,
wherein the holder has outward projecting portions;
the frame has a bottom and a flange portion partially formed with cutout portions;
the outward projecting portions of the holder correspond to the cutout portions of the flange portion of the frame; and
the inner surfaces of the projecting portions of the holder correspond to the first end portion of the liquid crystal panel,
wherein the holder does not have a wall that horizontally accommodates the liquid crystal panel throughout the whole circumference of the liquid crystal panel, and
wherein the outward projecting portions serve as horizontal stoppers against the liquid crystal panel.

11. The liquid crystal display device according to claim 10, wherein the inner surfaces of the projecting portions of the holder serve as stoppers in the horizontal direction against the liquid crystal panel.

12. The liquid crystal display device according to claim 10, wherein the projecting portion of the holder are not formed at the second end portion of the liquid crystal panel.

13. A liquid crystal display device comprising:
a liquid crystal panel;
a holder for holding the liquid crystal panel thereon, the holder being formed of resin; and
a metallic frame for accommodating the holder,
wherein the metallic frame has a bottom and flange portions partially formed with a cutout portion;
the holder has outward projecting portions corresponding to the cutout portions of the flange portion of the metallic frame,
wherein the holder does not have a wall that horizontally accommodates the liquid crystal panel throughout the whole circumference of the liquid crystal panel, and
wherein the outward projecting portions serve as horizontal stoppers against the liquid crystal panel.

14. The liquid crystal display device according to claim 13, wherein the metallic frame is formed of stainless steel.

15. The liquid crystal display device according to claim 13, wherein the metallic frame has a thickness of 0.3 mm or smaller.

16. The liquid crystal display device according to claim 13,
wherein the liquid crystal panel includes an upper glass substrate and a lower glass substrate of a larger area than the upper glass substrate;
the liquid crystal panel has a first end portion at which the upper glass substrate and the lower glass substrate overlap each other and a second end portion of only the lower glass substrate;
the liquid crystal panel is placed on a holder, the holder being accommodated inside the metallic frame; and
the projecting portions of the holder are formed at the first end portion of the liquid crystal panel.

17. The liquid crystal display device according to claim 13,
wherein the holder is rectangular in shape; and
when a half of the length of each short side of the holder is assumed to be n, the center of one of the projecting portions of the holder is positioned with a distance of n/2 or less from a corner of the holder.

18. The liquid crystal display device according to claim 13,
wherein the holder is rectangular in shape; and
when a half of the length of each long side of the holder is assumed to be m, the center of one of the projecting portions of the holder is positioned with a distance of m/2 or less from a corner of said holder.

* * * * *